United States Patent [19]
Cook, Jr. et al.

[11] Patent Number: 5,188,146
[45] Date of Patent: Feb. 23, 1993

[54] HYDRAULIC SWIVEL

[75] Inventors: Harold T. Cook, Jr., Bainbridge Island; Donn B. Furlong, Bellevue; Robert A. Svendsen; Allan P. Rustad, both of Seattle, all of Wash.

[73] Assignee: Marco Seattle, Inc., Seattle, Wash.

[21] Appl. No.: 713,167

[22] Filed: Jun. 11, 1991

[51] Int. Cl.⁵ ............................................. F16L 39/04
[52] U.S. Cl. ..................................... 137/580; 285/136
[58] Field of Search ............... 137/580, 355.16, 355.19; 285/136

[56] References Cited

U.S. PATENT DOCUMENTS

| | | | |
|---|---|---|---|
| 3,908,695 | 9/1975 | Dunbar | 137/580 |
| 4,683,912 | 8/1987 | Dubrosky | 137/580 |
| 4,749,335 | 6/1988 | Brandt et al. | 137/580 X |
| 4,790,699 | 12/1988 | Ringel | 137/580 X |

*Primary Examiner*—Martin P. Schwadron
*Assistant Examiner*—Kevin L. Lee
*Attorney, Agent, or Firm*—Christensen, O'Connor, Johnson & Kindness

[57] ABSTRACT

A hydraulic swivel 40 transfers pressurized hydraulic fluid from a stationary spool 50 to a housing 42 mounted for rotation relative to the spool 50. The swivel 40 also carries a drain line 64 placed in fluid communication with the spool/housing interface above and below the pressurized fluid passages so that any fluid leaking from the pressurized fluid passages will find its way to the drain and thus not to the outside of the swivel.

8 Claims, 11 Drawing Sheets

HYDRAULIC SWIVEL

FIELD OF THE INVENTION

The present invention relates to hydraulic swivels, and more particularly, to a hydraulic swivel that does not require high pressure seals.

BACKGROUND OF THE INVENTION

Powered blocks for hauling nets from the ocean to the deck of a vessel are hung from booms above the deck. The blocks are powered by hydraulic motors, requiring that hydraulic lines be strung up the boom and down to the block. Some blocks employ tailing wheels to press the net into the bight of the sheave. These blocks can only be run in one direction. As a consequence when changing the side of the ship from which the haul is being made, the block must be swiveled sometimes through more than 180°. If only two or three hydraulic lines run to the block, keeping the lines from tangling or kinking is manageable. However, modern blocks with tailing wheels many times have up to seven lines running to the block, resulting in the need for a hydraulic swivel that allows the block to rotate without regard to twisting or kinking of lines.

While prior swivels may be used, all have certain drawbacks. First, they are all expensive and require high pressure seals. High pressure seals are responsible for high frictional faces in the swivel, thus causing undesirable resistance to rotation. Conventional swivels are made of steel and are therefore heavy and bulky. In addition, conventional swivels result in relatively high pressure drops, as the hydraulic fluid traverses the swivel, thus wasting energy.

SUMMARY OF THE INVENTION

The present invention provides a hydraulic swivel construction that eliminates the need for high pressure seals and at the same time a hydraulic swivel that can be made from lightweight material such as anodized aluminum. The hydraulic swivel comprises a housing having a cylindrical spool bore. The housing has at least one pressure channel therein communicating between an external port on the housing and an internal port on the wall of the spool bore. A spool is mounted for rotation in the spool bore. Means for retaining the spool in the bore to maintain it in a substantially fixed axial position is also provided. The spool has an outside wall that is located in mutually opposing relationship with the inside wall of the housing. The spool has at least one end portion accessible from the exterior of the housing. The spool has at least one pressure channel therein communicating between an external port on the one end portion of the spool and an internal port on the outside wall of the spool. The internal ports for the pressure channels in the housing and spool are mutually aligned in axial relationship and are placed in fluid communication by an annular passage formed in at least one of the inside and outside walls. The spool further has at least one spool drain channel. The spool drain channel communicates between an external port on the one end of the spool and a first internal spool drain port on the inside wall of the spool. The first internal spool drain port is positioned between the one end of the spool and the annular passage coupling the pressure ports. At least one of the spool and the housing has an annular drain passage formed in a respective inside or outside wall communicating said internal spool drain port.

BRIEF DESCRIPTION OF THE DRAWINGS

A better understanding of the present invention can be derived by reading the ensuing specification in conjunction with the accompanying drawings wherein.

DETAILED DESCRIPTION OF THE INVENTION

Figure 1:
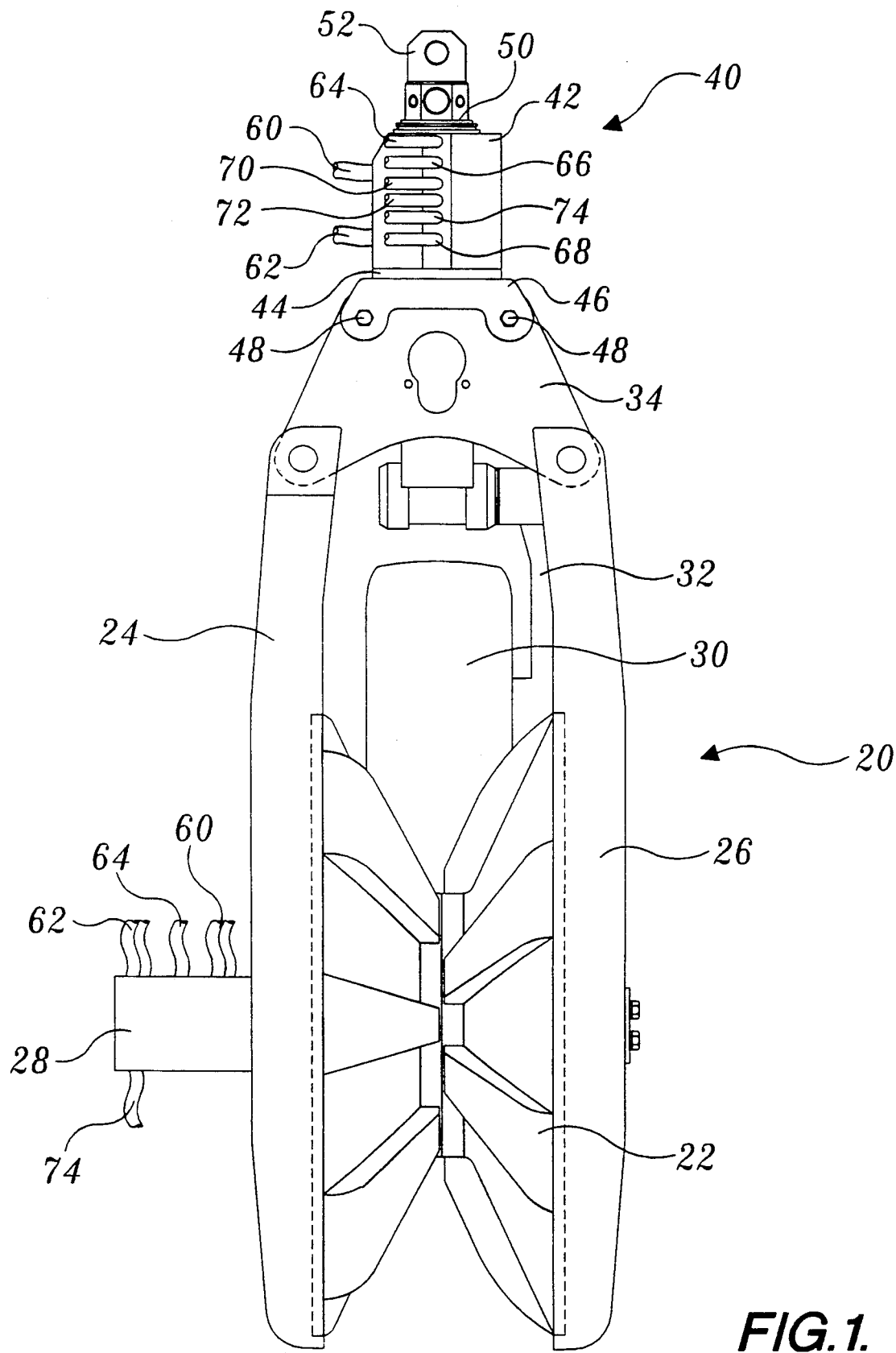
FIG. 1 is an end view of a net hauling block suspended from the hydraulic swivel constructed in accordance with the present invention.
Figure 2:
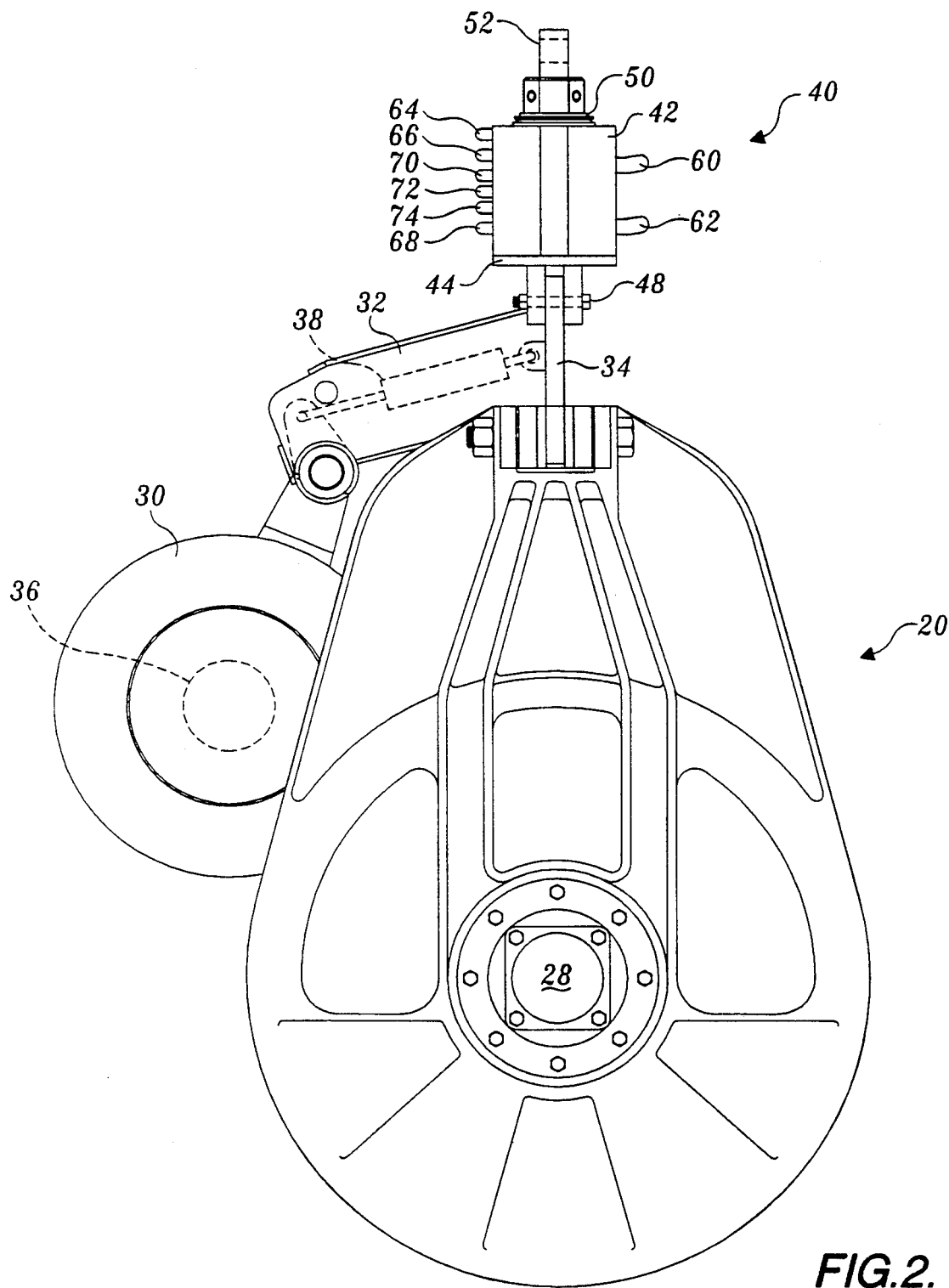
FIG. 2 is a side view of the net hauling block of the present invention illustrated in FIG. 1.
Figure 3:
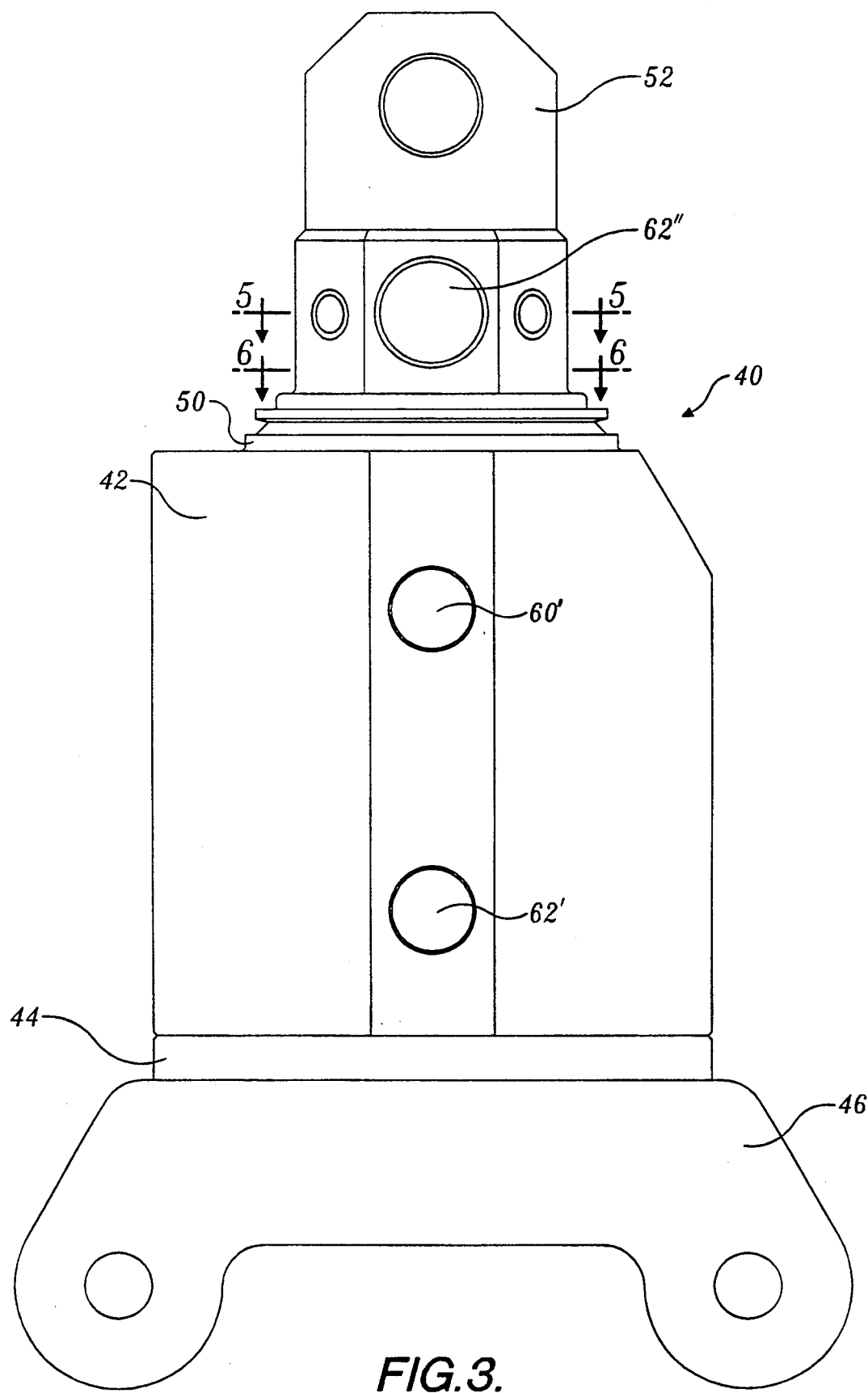
FIG. 3 is a side view of the hydraulic swivel.
Figure 4:
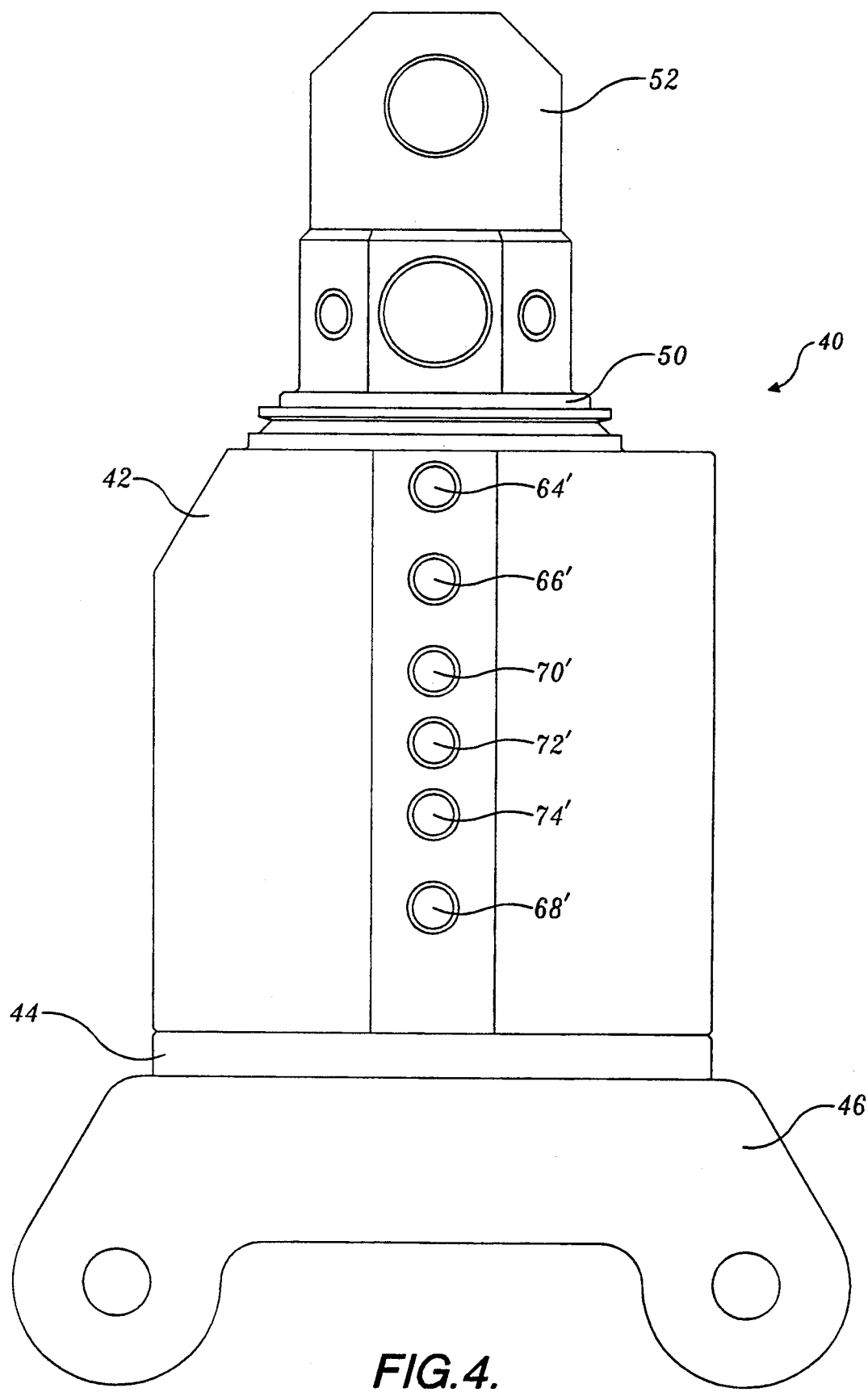
FIG. 4 is an opposite side view of the swivel.

Referring first to FIG. 1, the net hauling block 20 includes a sheave 22 mounted for rotation in a conventional manner in left and right support shells 24 and 26. The sheave 22 is rotated about its rotational axis by a hydraulic motor 28 coupled to the sheave 22 through an internal gear box. A tailing wheel 30 is mounted on a swingable bracket 32 to the yoke 34 coupled to the upper ends of the support shells 24 and 26. The tailing wheel 30 is also driven by a second hydraulic motor 36 coupled in a conventional manner to the tailing wheel 30. A hydraulic cylinder 38 swings the tailing wheel 30 into and out of engagement with the bight of the sheave 22.

The swivel 40 constructed in accordance with the present invention includes a housing 42 with a bottom plate 44. A flange 46 extends downwardly from the bottom plate 44 and is coupled by suitable fasteners 48 to the yoke 34. The upper end of a spool 50 protrudes from the upper portion of the housing 42. A mounting tab 52 extends upwardly from the upper portion of spool 50 for connection of the swivel 40 to a boom or other suspending device. Two large hydraulic lines 60 and 62 extend from the backside of the housing 42 to the main hydraulic motor 28. A drain line 64 extends from the hydraulic motor 28 to the front side of the housing 42. Similarly, hydraulic conduits 66 and 68 extend from the front side of the housing 42 to the tailing wheel motor 36. Hydraulic lines 70 and 72 extend to operate the tailing wheel swing cylinder 38. Hydraulic line 74 also extends to the main hydraulic motor 28 to pressurize the gear changer of the two-speed hydraulic motor. The upper end of the spool 50 also carries suitable hydraulic ports that run up to the boom and then to the valves, pumps and reservoir, as the case may be.

Referring now conjunctively to FIGS. 3 through 7, the swivel 40 will be described in more detail. The housing 42 is a cylindrically shaped shell having an internal spool bore 80. The spool bore 80 extends in a generally vertical direction through the center of the housing 42. An enlarged bore 82 joins the spool bore 80 at its lower end. The enlarged bore 82 creates a downwardly facing annular shoulder 86 which carries a thrust bearing 84. The spool 50 is rotatably mounted in the spool bore 80. The bottom portion of the spool 50 carries an annular flange 88 that extends radially outwardly from the bottom of the spool. The flange 88 has a diameter substantially the same as the diameter of the enlarged bore 82. The upper portion of the flange 88 forms a shoulder 90 that bears against the bottom side of the thrust bearing 84. Thus the combination of the shoulders 86 and 90 and the bearing 84 maintains the spool 50 as retained against the bearing 84 by bottom plate 44.

Figure 6:
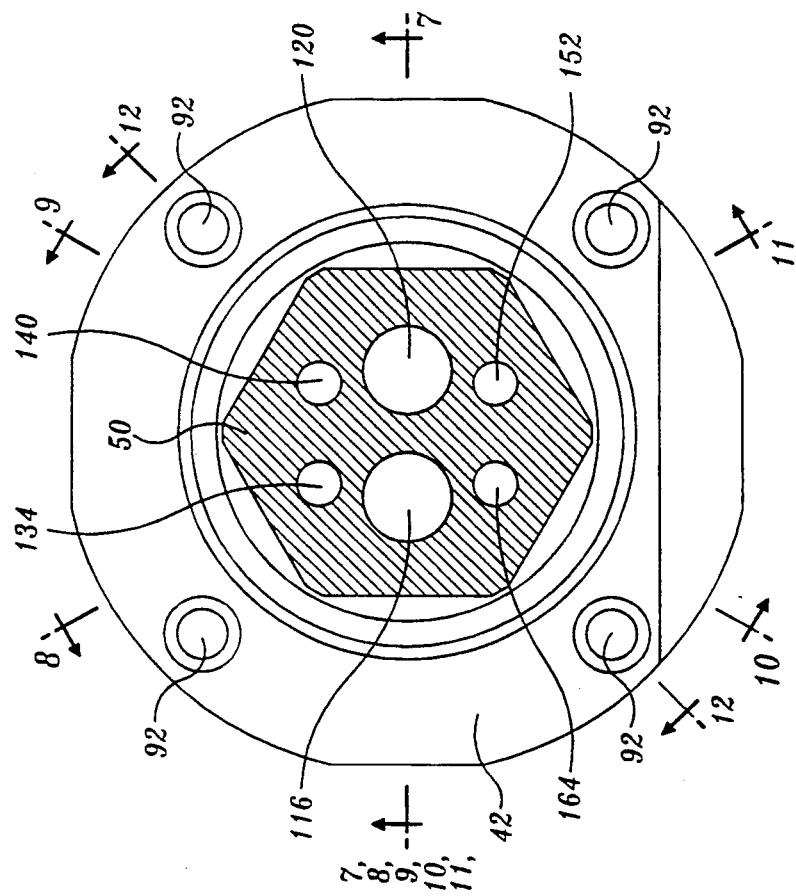
FIG. 6 is a cross-sectional view of the swivel taken along section line 6—6 of FIG. 3.
Figure 5:
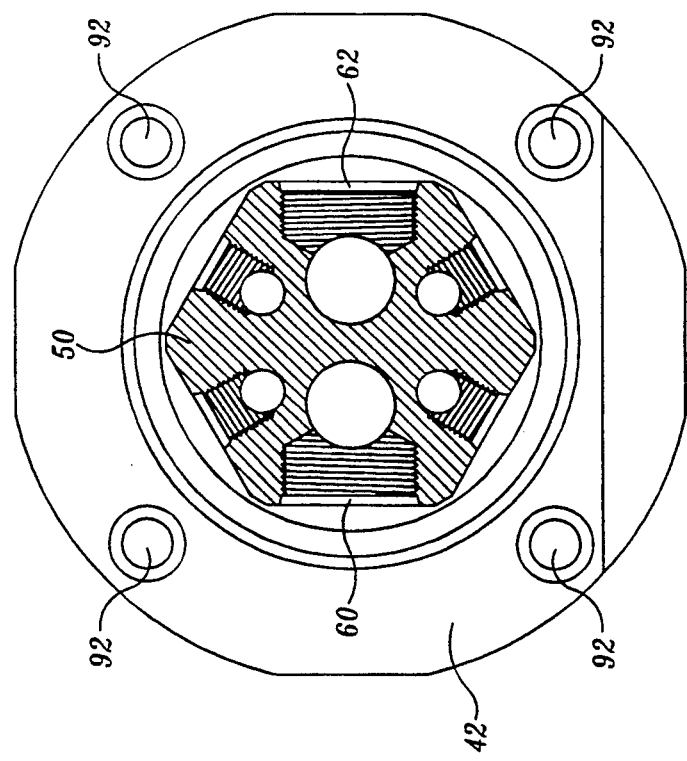
FIG. 5 is a cross-sectional view of the swivel through section line 5—5 of FIG. 3.
Figure 12:
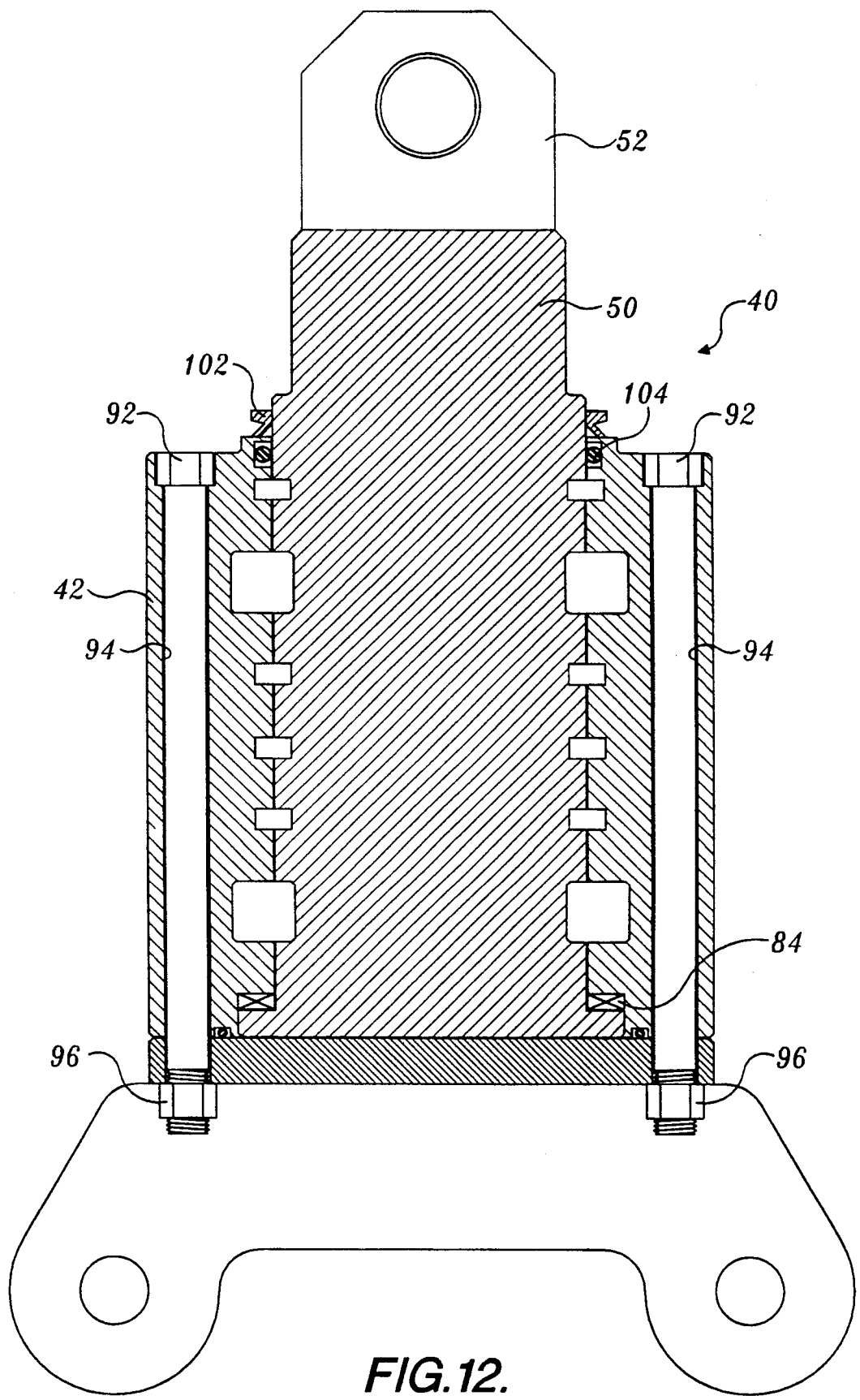
FIG. 12 is a longitudinal sectional view of the swivel taken along section line 12—12 of FIG. 6.

Referring to FIGS. 5, 6 and 12, bottom plate 44 is fastened to the housing 42 by four bolts 92. The bolts 92 extend through mutually aligned bores 94 in the housing 42 and the bottom plate 44 and are secured with suitable nuts 96. An O-ring seal 98 is positioned in an annular groove 99 situated on the bottom of the housing 42 and is slightly compressed against the top of the plate 44. The O-ring is compressed sufficiently to prevent low pressure hydraulic fluid from escaping the housing.

Spool 50 extends upwardly above the upper end of the housing 42 and terminates in a pair of mounting tabs 52. A flexible dust seal 102 is fitted about the exposed portion of the spool 50 adjacent the upper end of the housing 42 and bears down against the upper surface of the housing 42 surrounding the spool 50 to prevent dirt from entering the spool bore 80. Immediately below the upper portion of the housing 42 an outwardly extending annular channel 103 is provided in the housing 42 which opens onto the spool bore 80. An O-ring seal 104 is positioned in the channel and bears against the outside of the spool 50 to prevent leakage of low pressure hydraulic fluid out of the spool bore 80. Because of the unique construction of the swivel 40 of the present invention, the seal 98 and 104 do not need to be high pressure seals. This is because the drain passages, which drain the casing of the hydraulic motors 28 and 36 back to the hydraulic tank, are in fluid communication with both ends of the spool 50 casing interface adjacent the seals 98 and 104. Thus high pressure oil never reaches the seals 98 and 104, but instead returns to the tank.

Figure 7:
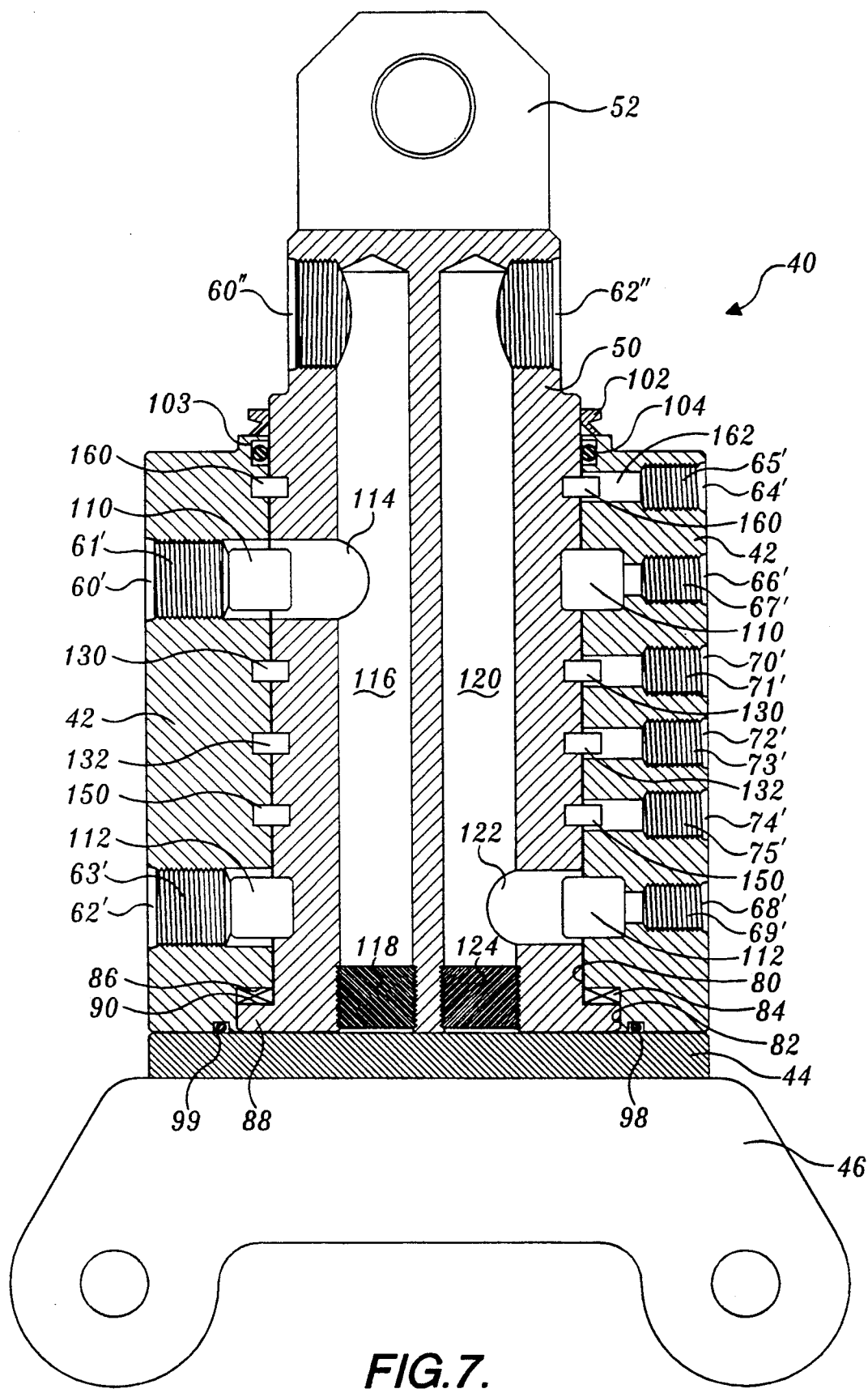
FIG. 7 is a longitudinal view of the swivel taken along section line 7—7 of FIG. 6.

Referring to FIG. 7, the main hydraulic motor pressure/return port 60' and 62' in the housing are in fluid communication through respective radial channels 61' and 63' with mutually opposing annular passages 110 and 112 in the walls of the spool bore 80 and on the outside surface of the spool 50. (The pressure/return ports/passages are many times referred to as the working ports or passages.) Annular passage 110 is placed in fluid communication by radial channel 114 with a longitudinal bore at 116 in the spool 50. The upper end of channel 116 is in fluid communication with external port 60". The lower end of bore 116 carries a plug 118. Annular passage 112 is placed in fluid communication with another longitudinal bore 120 by radial channel 122. The lower end of bore 120 also carries a plug 124 while the upper end of the bore is in fluid communication with external port 62" at the upper end of the spool. Pressure/return ports 66' and 68' on the housing, which are coupled to the tail wheel hydraulic motor, are also in fluid communication through respective radial channels 67' and 69' with passages 110 and 112. Both ports 60' and 62' open on one side of the housing while the port 66', 68' and all the remaining ports are positioned on the opposite side of the housing 42.

Figure 8:
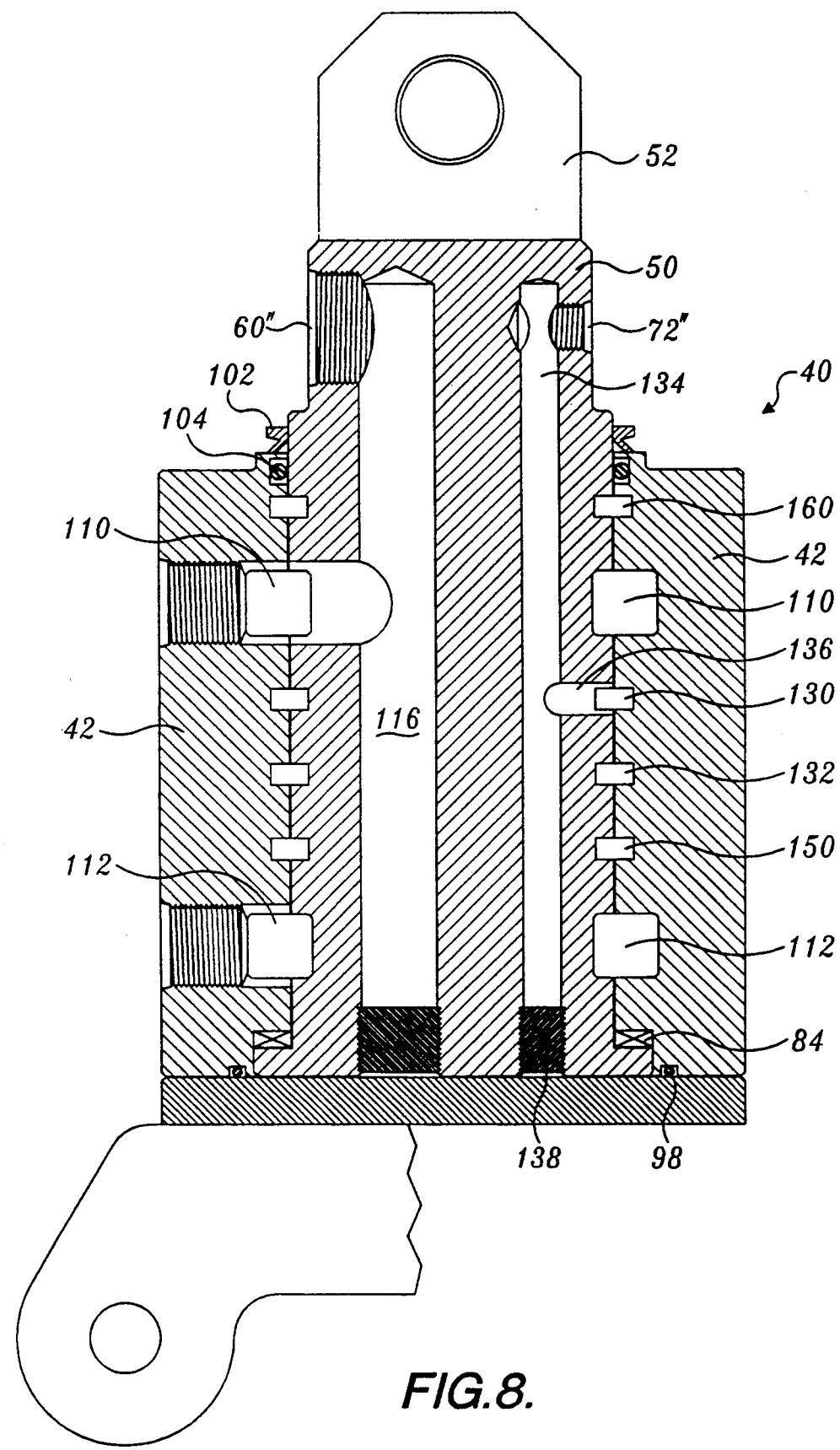
FIG. 8 is a longitudinal sectional view taken along section line 8—8 of FIG. 6.
Figure 9:
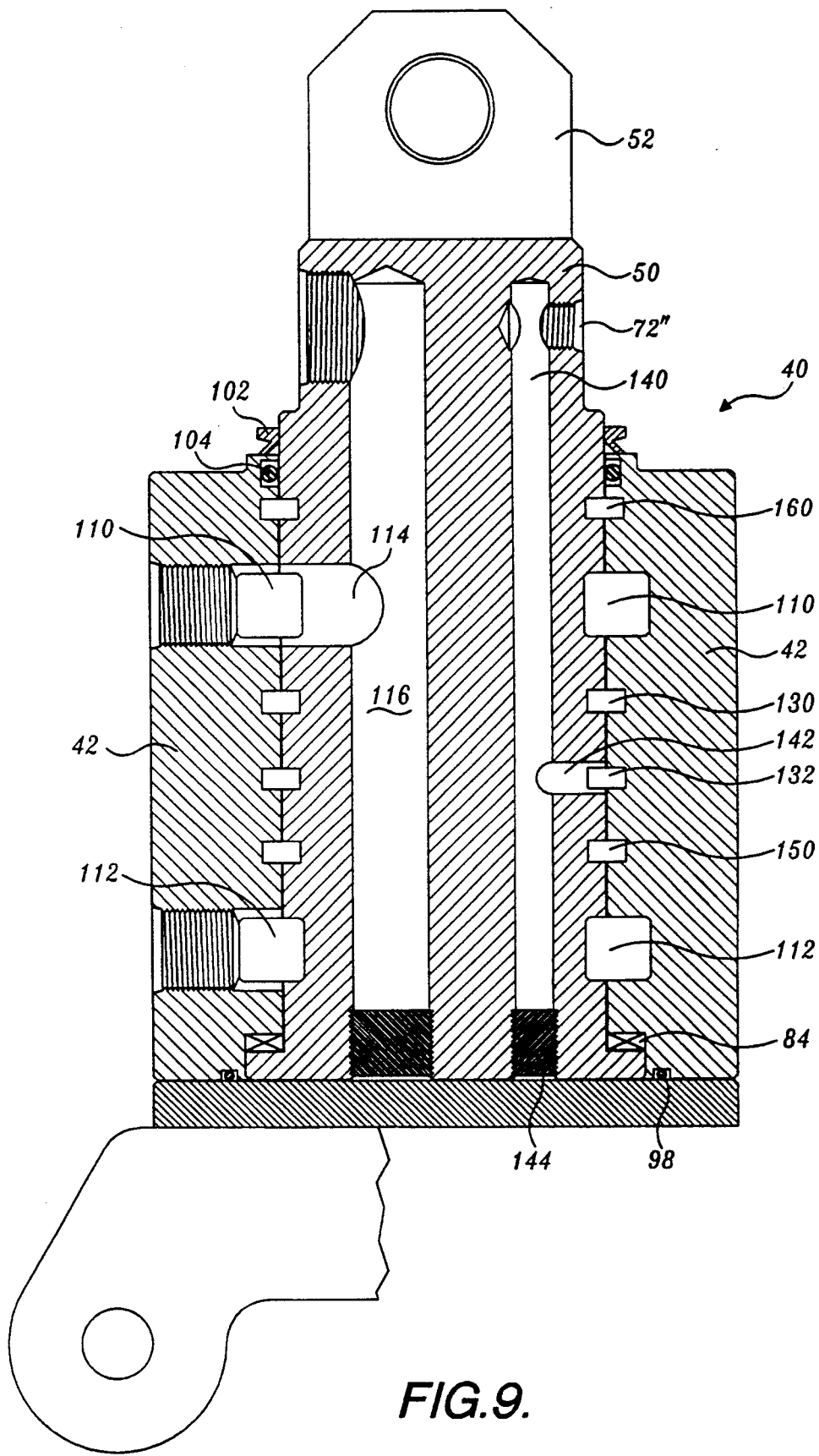
FIG. 9 is a longitudinal sectional view of the swivel taken along section line 9—9 of FIG. 6.
Figure 11:
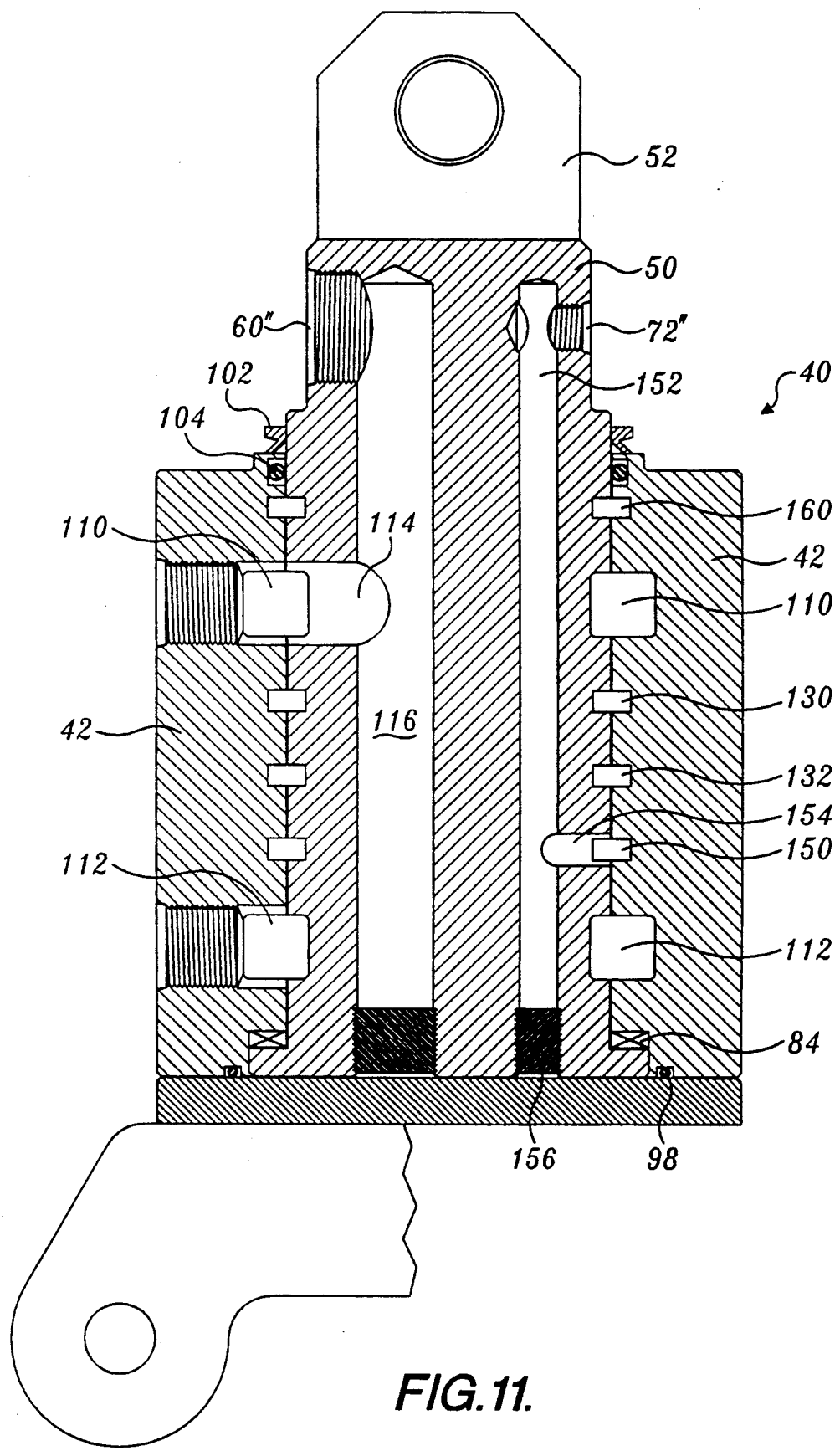
FIG. 11 is a longitudinal sectional view of the swivel taken along section line 11—11 of FIG. 6.

Referring now to FIGS. 7 and 8, ports 70' and 72' on the housing, which are coupled to the swing cylinder for the tailing wheel, are respectively in fluid communication through respective radial channels 71' and 73' with annular passages 130 and 132. The annular passages 130 and 132 are formed by mutually opposing passages in the outer surface of the spool 50 and the inner wall of the spool bore 80. Annular passage 130 is placed in fluid communication with a longitudinal bore 134 in spool 50 via a suitable radial channel 136. The upper end of bore 134 is placed in fluid communication with port 70" at the upper end of the spool. The lower end of bore 134 carries a plug 138 as shown in FIG. 8. Similarly, as shown in FIG. 9, the annular passage 132 (which is in fluid communication with port 72' (FIG. 7)) is placed in fluid communication with yet another internal longitudinal bore 140 in the spool 50 via radial channel 142. The upper end of the bore 140 is in fluid communication with port 72" at the upper end of the spool while the lower end of bore 140 carries a plug 144. The remaining pressure port 74' is in fluid communication through radial channel 75' with annular passage 150. Annular passage 150 is again composed of mutually opposing annular channels formed in the outer surface of the spool 50 and the wall of the spool bore 80. Annular passage 150, as shown in FIG. 11, is placed in fluid communication with longitudinal bore 152 by radial bore 154. The upper end of longitudinal bore 152 is placed in fluid communication with port 72" at the upper end of the spool 50. The bottom end of the bore 152 carries a plug 156.

All of the pressurized channels and passages are positioned in the central portion of the spool 50 and housing 42. The drain port 64' is placed in fluid communication through radial channel 65' with yet another annular passage 160 composed of mutually opposing annular passages in the outer surface of the spool 50 and the wall of the spool bore 80 by radial channel 162. Annular passage 160 is positioned above all of the annular pressure passages 112, 150, 132, 130, and 114.

Figure 10:
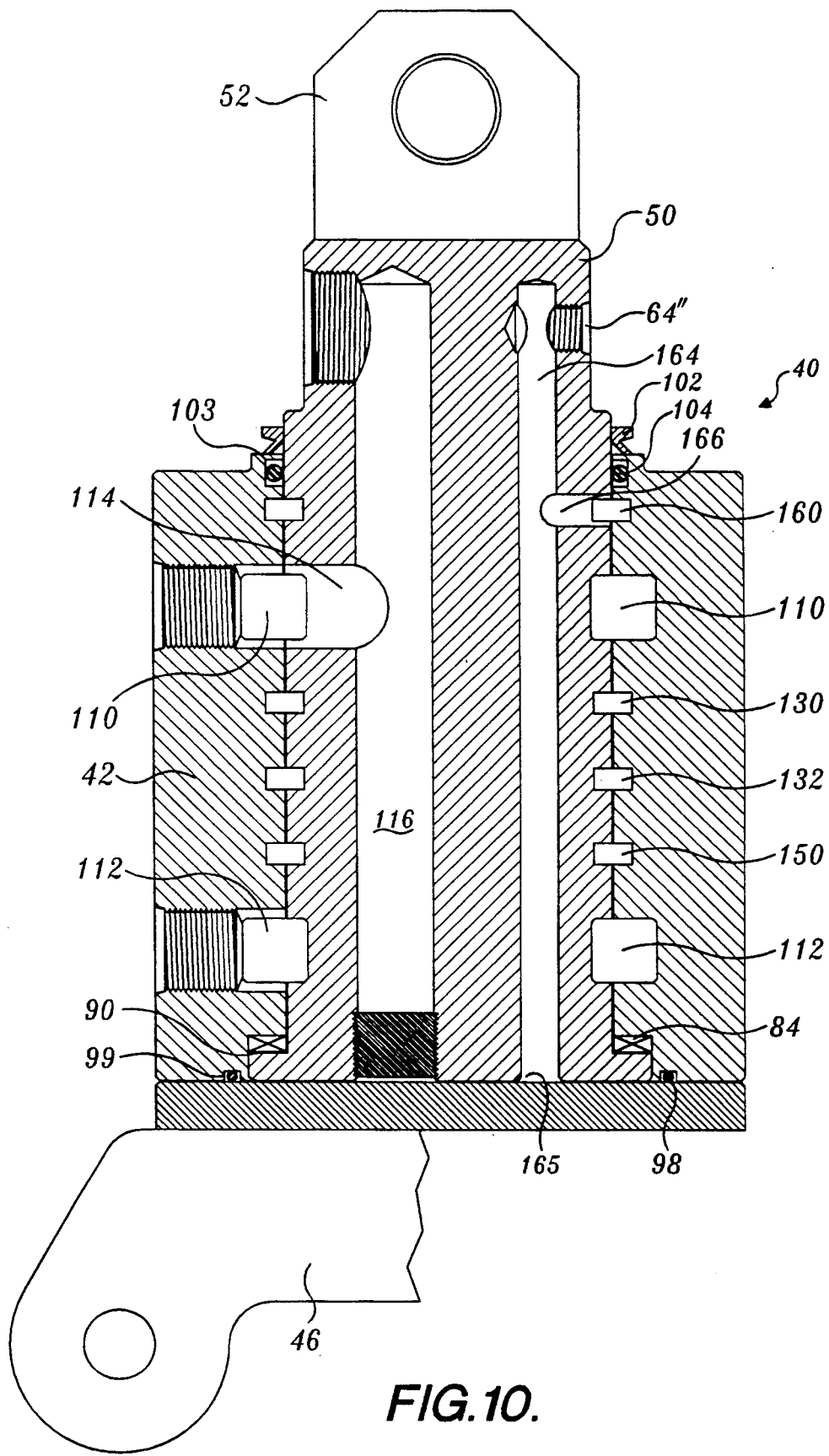
FIG. 10 is a longitudinal sectional view of the swivel taken along section line 10—10 of FIG. 6.

Referring to FIG. 10, annular passage 160 is placed in fluid communication with longitudinal drain bore 164 in the spool 50 via radial channel 166. The upper end of the drain bore 164 is in fluid communication with port 64" at the upper end of the spool 50. Port 64" is coupled by suitable hydraulic lines (not shown) back to the tank of the hydraulic system. Contrary to the other longitudinal bores in the spool 50, longitudinal drain bore 164 is open to the bottom of the spool 50 via port 165. Thus any pressurized hydraulic fluid leaking downwardly from the annular pressure/return passages 112, 114, 130, 132, and 150 finds its way to the drain bore 164. Because the drain bore is at a relatively low pressure (because it is open to the tank), the low pressure seals 98 and 104 use only the low pressure required to return the fluid to the tank. Also, the tolerances of the spool 50 and housing 42 are chosen such that some desirable leakage occurs from the pressure passages to lubricate the spool 50, the spool/bore interface, as well as the bearing 86. With proper lubrication, the housing 42 and spool 50 can be made of aluminum to reduce the overall weight of the swivel. Preferably the spool is hard anodized to harden its outside surface relative to the spool bore so that the surfaces do not gall and so that the swivel has a relatively long life.

The swivel constructed in accordance with the present invention is similar to a pressure lubricated journal bearing. The leakage rate from the working ports is controlled by the clearances. Thus no physical seals, such as O-rings, are required. The oil flow between spool and housing walls thus provides a hydrodynamic bearing which is constantly lubricated and which has little resistance to rotation. Moreover, because warm hydraulic fluid is always running through the swivel at a controlled rate, the swivel is maintained at a constant temperature, thus eliminating problems caused in conventional swivels from thermal expansion and contraction.

The present invention has been disclosed in conjunction with the preferred embodiment. One of ordinary skill will be able to effect various changes, substitutions of equivalents and make other alterations without departing from the broad concepts disclosed herein. It is therefore intended that the Letters Patent granted hereon be limited only by the definition contained in the appended claims and equivalents thereof.

The embodiments of the invention in which an exclusive property or privilege is claimed are defined as follows:

1. A hydraulic swivel manifold comprising:
    a housing having a cylindrical spool bore therethrough, said spool having an axis, said spool bore having an inside wall, said housing having at least one set of pressure and return channels therein, said pressure and return channels communicating between external ports on said housing and internal ports opening onto said inside wall;
    a spool mounted for rotation in said spool bore and means for retaining said spool in said spool bore to maintain it in a substantially fixed axial position relative thereto, said spool having an outside wall that is located in mutually opposing relationship with said inside wall of said housing, said spool having at least one end portion accessible from the exterior of said housing, said spool having at least one set of pressure and return channels therein, said channels individually communicating between external ports on said one end portion and internal ports opening onto said outside wall, said internal ports for said pressure channels being mutually aligned in axial relationship and being placed in fluid communication by an annular passage formed in at least one of the inside and outside walls, said internal ports for said return channels being mutually aligned in axial relationship and being placed in fluid communication by an annular passage formed in at least one of the inside and outside walls; and
    said spool further having at least one spool drain channel, said spool drain channel communicating between an external port and a first internal spool drain port on said outside wall, said first internal spool drain port positioned between said one end of said spool and said annnular passages coupling the respective pressure and return ports, at least one of said spool and said housing having an annular drain passage formed in a respective inside or outside wall communicating with said first spool drain internal port, said spool drain channel further communicating with a second internal drain port, said second internal drain port being positioned at a location between the other end of the housing and the annular passages coupling the respective pressure and return ports.

2. The swivel of claim 1, wherein said one end portion of said spool is the top of said spool, and swivel further comprising means for attaching the top of said spool to an external device, and means for attaching the bottom of said housing to an external device.

3. The swivel of claim 2, further comprising an axial thrust bearing to receive thrust loads generated by an axial force on said spool and opposing force on said housing.

4. The swivel of claim 3 further comprising a first low pressure seal between said spool and said housing above said annular drain passage.

5. The swivel of claim 4, wherein the bottom of said housing comprises a removable plate that secures said spool against said thrust bearing, and a second low pressure seal positioned between said plate and the upper portion of said housing.

6. The swivel of claim 5, wherein said plate has an inner surface adjacent said spool, said second internal drain port being positioned adjacent said surface.

7. A hydraulic swivel manifold comprising:
    a housing having a cylindrical spool bore therethrough, said spool bore having an axis, said spool bore having an inside wall, said housing having at least one pressure channel therein, said pressure channel communicating between an external port on said housing and an internal port opening onto said inside wall;
    a spool mounted for rotation in said spool bore and means for retaining said spool in said spool bore to maintain it in a substantially fixed axial position relative thereto, said spool having an outside wall that is located in mutually opposing relationship with said inside wall of said housing, said spool having at least one end portion accessible from the exterior of said housing, said spool having at least one pressure channel therein, said channel communicating between an external port on said one end portion and an internal port opening onto said outside wall, said internal ports for said pressure channels being mutually aligned in axial relationship and being placed in fluid communication by an annular passage formed in at least one of the inside and outside walls; and
    said spool further having at least one spool drain channel, said spool drain channel communicating between an external port and an internal spool drain port on said outside wall, said internal spool drain port positioned between said one end of said spool and said annular passage coupling the pressure ports, at least one of said spool and said housing having an annular drain passage formed in a respective inside or outside wall communicating with said internal spool drain port, said spool drain channel further communicating with a second internal drain port, said second internal drain port being positioned on the other end of the spool and on the opposite side of said annular passage coupling the pressure ports.

8. The swivel of claim 7, wherein a controlled amount of leakage is allowed from said annular passage communicating with said pressure port to lubricate the region between the inside and outside walls.

* * * * *

UNITED STATES PATENT AND TRADEMARK OFFICE
CERTIFICATE OF CORRECTION

PATENT NO. : 5,188,146
DATED : February 23, 1993
INVENTOR(S) : H. T. Cook, Jr. et al.

It is certified that error appears in the above-identified patent and that said Letters Patent is hereby corrected as shown below:

| COLUMN | LINE | |
|---|---|---|
| 3 | 43 | "seal" should read --seals-- |
| 5 | 29 | after "spool" (first occurrence) insert --bore-- |
| 6 | 9 | "claim 2" should read --claim 1-- |
| 6 | 13 | "claim 3" should read --claim 3,-- |

Signed and Sealed this

Thirtieth Day of November, 1993

Attest:

BRUCE LEHMAN

*Attesting Officer*   *Commissioner of Patents and Trademarks*